United States Patent Office 2,721,857
Patented Oct. 25, 1955

2,721,857
ORGANOSILOXANE ELASTOMERS CONTAINING BORON COMPOUNDS

Norbert G. Dickmann, Midland, Mich., assignor to Dow Corning Corporation, Midland, Mich., a corporation of Michigan No Drawing. Application September 7, 1954, Serial No. 454,603

5 Claims. (Cl. 260—46.5)

The present invention relates to organopolysiloxane rubber stocks having improved handling characteristics.

Organopolysiloxane rubber has been widely accepted and used in industry and commerce. This material has unique characteristics probably the most important of which is the retention of the desired physical properties at extremes of temperature. In spite of the excellent properties of the vulcanized silicone rubber, difficulty is often encountered in the fabrication of articles from certain unvulcanized silicone rubber stocks due to poor handling qualities and difficulty in obtaining satisfactory extrusions.

The poor handling characteristics resulted from the stickiness of the stocks. The fabricator would experience difficulty manually handling the stock because it would stick to his fingers as well as to the containers and other equipment with which the stock came into contact. The stock would not flow properly into shell molds. In general, the handling properties were such that the stock was difficult to work with.

Furthermore, the sticky stocks did not extrude properly. They stuck to the extruding equipment itself and did not feed smoothly and evenly. The result was an uneven extrusion which necessarily gave rise to a high percentage of rejects.

It is an object of this invention to prepare organopolysiloxane rubber stocks having improved handling properties. Another object is to prepare organopolysiloxane rubber stocks which will extrude satisfactorily reducing the expense in time and money heretofore required for the extruding process. Another object is to prepare a silicone rubber stock having good handling properties and good extrusion characteristics without sacrificing the desirable properties heretofore obtained with the vulcanized silicone rubber.

This invention relates to a composition of matter consisting essentially of (1) an organopolysiloxane of the average unit formula

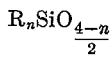

where R is selected from the group consisting of lower aliphatic hydrocarbon radicals, halogenated lower aliphatic hydrocarbon radicals, monocyclic aryl hydrocarbon radicals and halogenated monocyclic aryl hydrocarbon radicals, and $n$ has an average value in the range 1.99 to 2.0 inclusive, (2) .005 to .090 part by weight based on 100 parts of the organopolysiloxane of a boron compound selected from the group consisting of boric acid, boric acid anhydride, and alkyl borates.

The organopolysiloxanes of this invention have the average unit formula

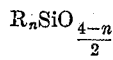

R can be any saturated or unsaturated aliphatic hydrocarbon radical containing less than 6 carbon atoms in the chain, any halogenated saturated or unsaturated aliphatic hydrocarbon radicals containing less than 6 carbon atoms in the chain, any monocyclic aryl hydrocarbon radicals and any halogenated monocyclic aryl hydrocarbon radical. The organopolysiloxanes employed in this invention are essentially diorganosiloxanes but may contain very limited amounts of monoorgano and/or triorgano substituted siloxanes so long as the average value of $n$ is as defined above.

Specific examples of R groups which are operative in this invention are alkyl groups such as methyl, ethyl, and butyl; alkenyl groups such as vinyl, allyl and pentenyl; halogenated aliphatic hydrocarbon radicals such as chloromethyl, trifluorovinyl, chlorodifluorovinyl, and perfluoroethyl; monocyclic aryl radicals such as phenyl and tolyl and halogenated monocyclic aryl radicals such as dichlorophenyl, bromophenyl

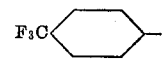

and $(F_3C)_2C_6H_3\text{—}$.

It is to be understood that the siloxanes employed herein can be homopolymeric or they can be copolymeric materials containing two or more different types of siloxane units. The organic radicals attached to any one silicon atom can be of the same type or they can be different radicals.

The boron compounds which are operative herein include boric acid, boric acid anhydride, and any alkyl borate such as ethyl borates, butyl borates and hexyl borates and mixtures thereof. The boron compound is present in small amounts of from .005 to .090 part by weight per 100 parts of the organopolysiloxane. When the boron compound is present in amounts less than .005 part by weight, the desired improved handling properties are not obtained. Further, when the boron compound is present in an amount exceeding the upper limit set forth above, the physical properties of the resulting silicone elastomer are seriously impaired.

In addition to the organopolysiloxane and boron compound, the compositions of this invention may include any of the well-known silicone rubber fillers. Illustrative of the fillers which may be included herein are silica, titania, glass, zinc oxide, iron oxide and other heavy metal oxides, diatomaceous earth, asbestos, cork, clay, hydrated calcium silicate, zinc sulfide, silica aerogel, fume silica, barium titanate, bentonite, magnesia, micronized graphite, micronized slate, micronized mica and the like.

Further, any of the well-known silicone rubber vulcanizing agents may be incorporated into the compositions of this invention without departing from the scope of this invention. Examples of the vulcanizing agents operative herein are organic peroxides, organometallic compounds, zirconyl nitrate, phosphorous halide, alkoxy silicates, antimony pentachloride, sulfur, organic sulfur compounds or combinations thereof.

It should be understood that all methods for vulcanizing the rubber stocks of this invention are contemplated herein. The rubber may be vulcanized by use of a vulcanizing agent and heat as set out above, by heat alone, by ultra violet light or by any other known method.

The compositions of this invention may be mixed in any order desired. However, because of the relatively minor amount of boron compound employed, it is preferred to add the boron compound directly to the organopolysiloxane polymer as the initial step in the process. This insures the maximum dispersion of the boron compound throughout the mixture. The boron compound may be added either as a powder solution or as a paste such as, for example, 1 part of the boron compound per 9 parts of the organopolysiloxane polymer.

The organopolysiloxane rubber stocks of this invention are characterized by their excellent handling properties and the ease with which they can be extruded. The small amount of boron compound included in the stocks of this invention produces a totally unexpected improvement in handling and extrudability without loss of the other physical properties and especially without a significant increase in compression set.

The following examples serve to give those skilled in the art a better understanding of this invention. All of the examples are merely illustrative and are not to be construed as limiting this invention, the scope of which is properly delineated in the appended claims.

EXAMPLE 1

In this example and all of the examples which follow, all parts and percentages are based on weight unless otherwise specified.

A silicone rubber stock composed of 100 parts of dimethylsiloxane, 65 parts fume silica filler, 5 parts barium zirconate, 1 part zinc oxide and 1.6 parts dichlorobenzoyl peroxide was compounded on a two-roll mill. Four separate samples of this stock were compounded as above. One sample was employed as a control, while .01 part boric acid was added to the second sample, .04 part boric acid was added to the third and 0.4 part boric acid was added to the fourth sample. The plasticity of the samples was measured. All four samples were molded for five minutes at 125.6° C. (20 pounds of steam). Durometer, tensile strength and elongation were measured after this initial molding. A portion of each sample was then cured for 1 hour at 150° C. followed by heating at 250° C. for 24 hours. After this curing schedule, durometer, tensile strength, elongation, and compression set were measured. The compression set was measured after 22 hours at 150° C. according to the specification of A. S. T. M. test D 395–52T, Method B. The results of these tests are summarized in Table I below.

*Table I*

| Parts, Boric Acid | Plasticity | Cure, hours/temp. | Durometer | Tensile Strength, lbs./in² | Elongation, Percent | Compression Set |
|---|---|---|---|---|---|---|
| 0 | .104 | As molded | 42 | 908 | 573 | |
| .01 | .106 | do | 44 | 888 | 570 | |
| .04 | .108 | do | 44 | 882 | 573 | |
| .40 | .155 | do | 58 | 753 | 533 | |
| 0 | | 24 hrs./250° C | 75 | 663 | 197 | 25.6 |
| .01 | | 24 hrs./250° C | 75 | 682 | 190 | 24.1 |
| .04 | | 24 hrs./250° C | 77 | 643 | 170 | 24.1 |
| .40 | | 24 hrs./250° C | 78 | 593 | 157 | 64.4 |

The results set forth in Table I supra clearly indicate that the plasticity of the stock and the durometer, tensile strength, elongation, and compression set of the vulcanized silicone rubber are essentially unaffected by adding to the silicone rubber stock .01 and .04 part of boric acid per 100 parts of the organopolysiloxane polymer. However, the addition of .4 part of boric acid results in a significant and totally undesirable rise in compression set and plasticity.

The rubber stock to which .01 part and .04 part of boric acid had been added exhibited improved handling characteristics. It was easier to work with because it was far less sticky and tacky than the control stock containing no boric acid. It exhibited better mold-flow than was obtained with the control stock, producing superior molded articles. It did not stick to the extruding apparatus and formed excellent extrusions. The handling properties were definitely and significantly improved without detriment to the physical properties. Whereas the rubber stock to which 0.4 part of boric acid had been added exhibited significant improvement in handling properties, the physical properties were too greatly affected and the extrudability was not at all satisfactory due to shear breakdown in stocks so loaded with boric acid.

EXAMPLE 2

A silicone rubber stock was compounded on a mill employing 100 parts of an organopolysiloxane copolymer consisting of 7.5 mol per cent phenylmethylsiloxane units, .142 mol per cent methylvinylsiloxane units and 92.358 mol per cent dimethylsiloxane units, 70 parts of a fume silica filler, and 2 parts iron oxide (mapico red). This stock was heated for 3 hours at 250° C. followed by re-milling and the addition of .7 part of dichlorobenzoyl peroxide. A control was employed with no boric acid added thereto, and .04 parts boric acid and .15 part boric acid per 100 parts organopolysiloxane were added to two other samples. The plasticity of the samples was measured. The samples were then precured and subjected to tests as in Example 1 and the results are tabulated in Table II.

*Table II*

| Parts, Boric Acid | Plasticity | Cure, hours/temp. | Durometer | Tensile Strength, lbs./in² | Elongation, Percent | Compression Set |
|---|---|---|---|---|---|---|
| | .130 | As molded | 52 | 815 | 363 | |
| .04 | .140 | do | 54 | 860 | 377 | |
| .15 | .155 | do | 59 | 868 | 410 | |
| 0 | | 6 hrs./250° C | 67 | 715 | 223 | 19 |
| .04 | | 6 hrs./250° C | 70 | 660 | 203 | 20 |
| .15 | | 6 hrs./250° C | 75 | 717 | 267 | 36 |
| 0 | | 24 hrs./250° C | 70 | 667 | 187 | 12 |
| .04 | | 24 hrs./250° C | 72 | 625 | 163 | 15 |
| .15 | | 24 hrs./250° C | 78 | 530 | 143 | 39 |

Table II shows again that while the addition of boric acid within the range of the instant invention does not have any marked detrimental effect on the physical properties of the vulcanized silicone rubber, the addition of larger amounts, e. g. .15 part per 100 parts of organopolysiloxane, results in a marked increase in compression set.

The handling properties of the silicone rubber stock containing .04 part of boric acid were very much superior to the handling properties of the silicone rubber containing no boric acid (i. e., the control). Similarly, the stock containing .04 part of boric acid produced far better extrusions than could be obtained with either the control or with the stock containing .15 part of boric acid.

EXAMPLE 3

Two portions of a silicone rubber stock were compounded on a two-roll mill. Each portion consisted of 100 parts of the organopolysiloxane copolymer of Example 2, 50 parts fume silica filler, 2 parts iron oxide and there were .06 part boric acid in one portion and no boric acid in the control portion. The two portions were heated for 3 hours at 250° C. and were then remilled with .7 part of dichlorobenzoyl peroxide added to each one. The plasticity of each stock was measured. Both portions were divided into samples which were molded at 125.6° C. (20 pounds of steam) for 5 minutes. One sample of each portion was tested as molded. A second sample of each portion was precured for 1 hour at 150° C. and cured at 250° C. for 6 hours. A third sample of each was precured for 1 hour at 150° C., and cured at 250° C. for 24 hours. The physical properties tabulated in Tables I and II were measured on these stocks and the results are tabulated in Table III. The same properties were rechecked after the rubber stock had aged for four weeks and the results are tabulated in Table IV.

Table III

| Parts, Boric Acid | Plasticity | Cure, hours/temp. | Durometer | Tensile Strength, lbs./in² | Elongation, Percent | Compression Set |
|---|---|---|---|---|---|---|
| 0 | .117 | As molded | | | | |
| .06 | .134 | do | | | | |
| 0 | | 6 hrs./250° C | 46 | 1107 | 410 | 14 |
| .06 | | 6 hrs./250° C | 48 | 1167 | 460 | 27 |
| 0 | | 24 hrs./250° C | 48 | 1020 | 350 | 7 |
| .06 | | 24 hrs./250° C | 51 | 872 | 357 | 18 |

Table IV

| Parts, Boric Acid | Plasticity | Cure, hours/temp. | Durometer | Tensile Strength, lbs./in² | Elongation, Percent | Compression Set |
|---|---|---|---|---|---|---|
| 0 | .125 | 24 hrs./250° C | 48 | 1113 | 400 | 10 |
| .06 | .135 | 24 hrs./250° C | 51 | 875 | 350 | 16 |

It is again apparent that the physical properties of the vulcanized rubber are not seriously reduced by the inclusion of boric acid in the amounts taught by this invention. The handling properties and extrudability of the stocks containing boric acid are far superior to that obtained with other stocks.

EXAMPLE 4

Equivalent results are obtained when either boric acid anhydride or ethyl borate is employed for the boric acid of Example 3.

EXAMPLE 5

Equivalent results are obtained when either a copolymer of 10 mol per cent trifluorovinylmethylsiloxane and 90 per cent dimethylsiloxane or a copolymer of 10 mol per cent

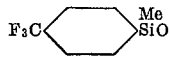

and 90 mol per cent dimethylsiloxane is employed in the method of Example 1.

That which is claimed is:

1. A composition of matter consisting essentially of (1) an organopolysiloxane of the average unit formula

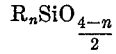

where R is selected from the group consisting of lower aliphatic hydrocarbon radicals, monocyclic aryl hydrocarbon radicals, halogenated monocyclic aryl hydrocarbon radicals and halogented lower alphatic hydrocarbon radicals, and $n$ is in the range of 1.99 to 2.0 inclusive, and (2) .005 to .090 part by weight based on 100 parts of the organopolysiloxane of a boron compound selected from the group consisting of boric acid, boric acid anhydride, and alkyl borates.

2. A composition of matter consisting essentially of (1) an organopolysiloxane having the average unit formula $$R_nSiO_{\frac{4-n}{2}}$$

where R is selected from the group consisting of lower aliphatic hydrocarbon radicals, monocyclic aryl hydrocarbon radicals, halogenated monocyclic aryl hydrocarbon radicals, and halogenated lower aliphatic hydrocarbon radicals, and $n$ is in the range of 1.99 to 2.0 inclusive, (2) .005 to .090 part by weight based on 100 parts of the organopolysiloxane of a boron compound selected from the group consisting of boric acid, boric acid anhydride, and alkyl borates, and (3) a filler.

3. A composition of matter consisting essentially of (1) an organopolysiloxane of the average unit formula

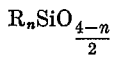

where R is selected from the group consisting of lower aliphatic hydrocarbon radicals, monocyclic aryl hydrocarbon radicals, halogenated monocyclic aryl hydrocarbon radicals, and halogenated lower aliphatic hydrocarbon radicals, and $n$ is in the range from 1.99 to 2.0 inclusive, (2) .005 to .090 part by weight based on 100 parts of the organopolysiloxane of a boron compound selected from the group consisting of boric acid, boric acid anhydride, and alkyl borates, (3) a filler, and (4) a vulcanizing agent.

4. A composition of matter consisting essentially of (1) a phenylmethylsiloxane having an average of from 1.99 to 2.0 inclusive total phenyl and methyl groups per silicon atom, (2) .005 to .090 part by weight per 100 parts of the siloxane of boric acid, (3) a filler, and (4) a vulcanizing agent.

5. A composition of matter consisting essentially of (1) a methylsiloxane having an average of from 1.99 to 2.0 inclusive methyl groups per silicon atom, (2) .005 to .090 part by weight per 100 parts of the siloxane of boric acid, (3) a filler, and (4) a vulcanizing agent.

References Cited in the file of this patent

UNITED STATES PATENTS

| 2,431,878 | McGregor | Dec. 2, 1947 |
| 2,442,613 | Nicodemus | June 1, 1948 |
| 2,459,387 | McGregor | Jan. 18, 1949 |